A. NELSON.
ROTARY FAN.
APPLICATION FILED FEB. 21, 1920.
1,352,829. Patented Sept. 14, 1920.
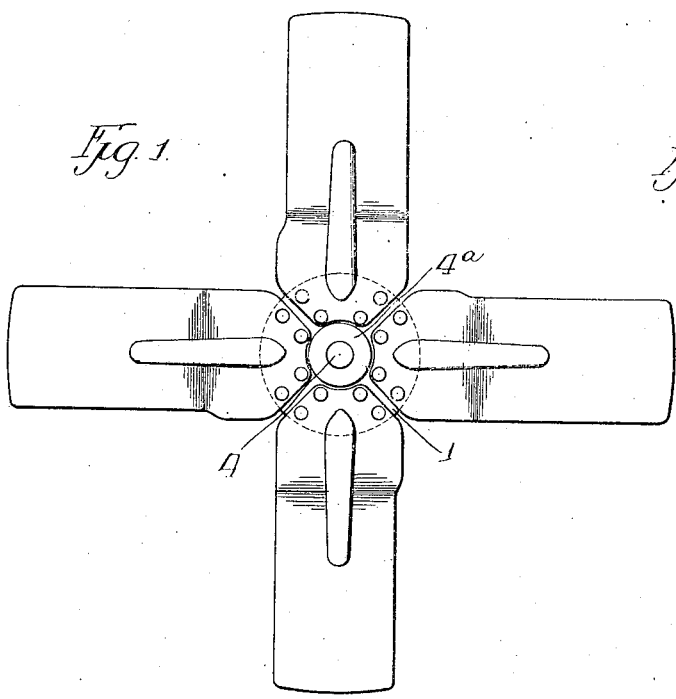
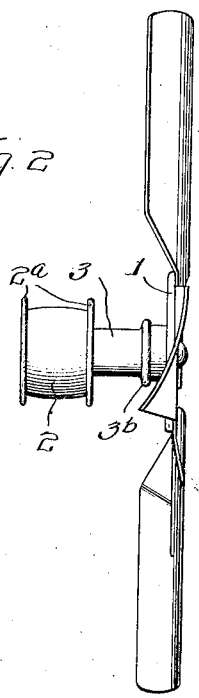
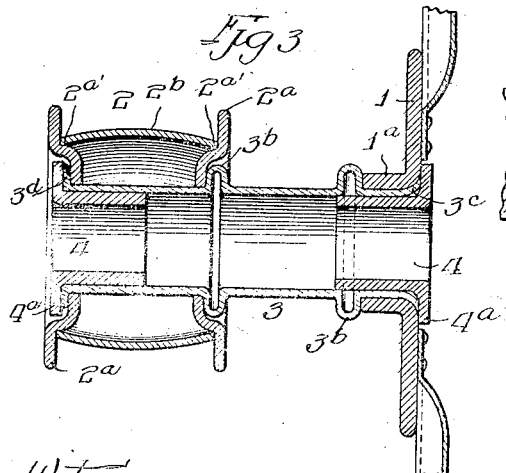
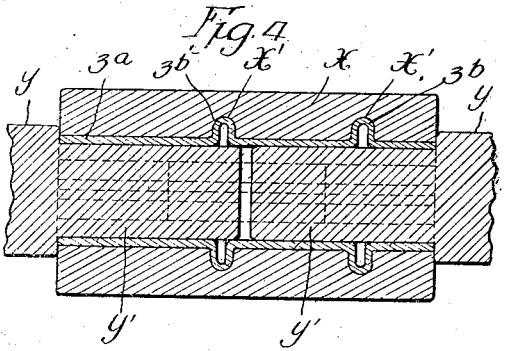
Witnesses
R. Burkhardt
A. J. Sauser
Inventor:
Arvid Nelson,
By Williamson Huxley, Byron & Knight
Attys

UNITED STATES PATENT OFFICE.

ARVID NELSON, OF CHICAGO, ILLINOIS, ASSIGNOR TO HOWE LAMP & MFG. CO., OF CHICAGO, ILLINOIS, A CORPORATION OF ILLINOIS.

ROTARY FAN.

1,352,829.

Specification of Letters Patent.   Patented Sept. 14, 1920.

Application filed February 21, 1920. Serial No. 360,521.

*To all whom it may concern:*

Be it known that I, ARVID NELSON, a citizen of the United States, residing at Chicago, in the county of Cook and State of Illinois, have invented certain new and useful Improvemeents in Rotary Fans, of which the following is a specification.

This invention relates to a rotary fan designed primarily for use as a cooling fan for the radiator of an automobile.

The object of the invention is to provide a light construction of rotary fan hub which will be very durable in service, and which can be cheaply produced, from commercial stock plate and tubing, in works equipped for metal pressing.

One feature of the invention consists in mounting the blade-receiving face-disk on the pulley fitted upon the respective ends of a tubular body member of thin metal and abutting against integral shoulders formed on said tubular body member by pressing its cylindrical wall radially outward at suitable points intermediate of its ends. Another feature consists in holding the face-disk and pulley members upon the tubular body by upsetting the ends of the tubular body against said members, preferably with a pressure that will seat the members firmly against the shoulders and leave the parts under such stress, within the elastic limits of the metal of the parts, as will insure permanent frictional contact sufficient to establish driving connection between said members and the tubular body. Another feature consists in bushing or boxing the ends of the tubular body member by flanged tubular bearing members, which are to provide turning bearings of the fan upon the spindle upon which it is to be mounted in use; a subordinate feature incident to this part of the invention consisting in the tubular bushings or boxes being made to fit the ends of the tubular body member with such radial pressure as will permanently bind the parts firmly together and make them turn as one structure in the operation of the fan; and a further subordinate feature incident to this part of the invention consisting in so determining the length of the tubular bushings or boxes as to leave between their inner ends a space of enlarged diameter that will serve effectively as a lubricant reservoir, and adapt the hub of the fan to be provided with a non-liquid grease, and to which the radial space afforded by one or more of the hollow shoulders of the tubular members may be added to increase the capacity of the lubricant holder.

Still another feature of the invention consists in building up the pulley member of two disks and a rim, of which the disks are pressed from plate metal in dished form in a manner to provide shoulders upon which the rim may rest, and the rim being formed from a section of tubing, preferably convexed in the direction of its axis to develop a crowned belt-receiving surface; a subordinate feature incident to this part of the invention consisting in shaping the shoulders of the pulley disks with a slight taper that causes them to enter within the edges of the rim member with a wedging effect that develops stress between the parts sufficient to insure permanent driving connection between them; and another feature subordinate to this part of this invention consisting in so shaping the dished portions of the disks as to develop resiliency in the direction of the axis of the pulley, and so permit the three parts of the pulley to be assembled between the radial shoulder of the tubular body and the upset end of the latter in a manner to leave the assembled structure under permanent strains within the limits of elasticity of the parts, and thereby insure permanent driving connection between the parts without the necessity of keying or otherwise interlocking them.

The invention will be fully understood upon reference to the accompanying drawing, in which—

Figure 1 represents a face view, and Fig. 2 a side elevation of a typical form of rotary fan for the production of which the present invention is particularly well adapted.

Fig. 3 is an axial section of the hub, with portions of the blades constructed in accordance with the present invention and embodied in the fan shown in Figs. 1 and 2; and Fig. 4 is a sectional view of a die and mandrels employed in forming the tubular body member of the hub.

The purpose of the present invention is to provide a novel construction of hub for a fan embodying a face-disk member 1, a pulley member 2, and a shank 3 connecting said members. Accordingly, a tube $3^a$ is placed in a die X having in its bore annular enlargements X' and pressed in the direction of its axis between shouldered mandrels Y having reduced ends Y' fitting the bore of the tube $3^a$; said axial pressure continuing until the metal of the cylindrical wall of the tube $3^a$ buckles forward and is folded upon itself in conformity with the annular recesses X' and thereby forms upon the tube $3^a$ circumferential shoulders $3^b$. The shouldered tube thus formed is then fitted at its respective ends with the face-disk 1, having a cylindrical attaching flange $1^a$, and the pulley 2, which is preferably constructed of pulley disks $2^a$ and the rim $2^b$. The face-disk member and the pulley disk member are seated against the shoulders $3^b$, and in order to hold them in place the ends $3^c$, $3^d$ of the shouldered tube are upset or expanded outside of said members and with sufficient pressure to force the members firmly to their seats against the shoulders. This upsetting may preferably be accomplished by use of pressure mandrels similar to mandrels Y shown in Fig. 4, the one used for upsetting end $3^c$ being, however, preferably tapered in a way to expand the end of the tube outwardly as well as in front of the disk 1. The pressure developed against the member thus confined between the upsetting of the end and the intermediate shoulder upon the tube is preferably such as to leave the parts under permanent stress, and therefore maintain continuous friction between the parts sufficient to transmit drive from one to the other.

The disks $2^a$ of the pulley member 2 are dished primarily to provide shoulders $2^{a'}$ for centering and supporting the rim $2^b$, the shape of the dishing and the selected diameter of the rim $2^b$ being such that the shoulders of the disks wedge within the rim and thereby establish a firm seating and permanent frictional drive between these parts. The dishing affords the additional advantage of lending resiliency to the pulley disks which may be developed by setting down the retaining lip $3^d$ against the pulley with sufficient force to leave these parts under permanent stress within their limit of elasticity, and so preventing the pulley from ever becoming loose upon the tubular body member of the hub. The dishing of the pulley disks serves the further purpose of affording recesses which admit the shoulder $3^b$ and the retaining lip $3^d$, thereby restricting the longitudinal dimension of the structure.

4 represents bushings or boxes introduced into the ends of the tubular body member 3 in order to afford substantial bearings for the spindles upon which the fan is to be mounted. These bushings or boxes will fit within the ends of the tube with sufficient snugness to hold them in permanent relation thereto, and their flanges $4^a$ overlying the retaining lips $3^c$, $3^d$ are in position to receive axial thrust developed upon the fan when in use. The flange $4^a$ of the bushing 4 at the pulley end of the tubular body will preferably be received within the recess afforded by the dishing of the end disk of the pulley.

The construction above described is especially adapted for the production of fan hubs from commercial stock plates and tubing by stamping and pressing, with little or no employment of other machinery, and particularly without the use of threading machinery, lathe work, riveting, etc., and the fan produced is of very light and durable construction, and cheap to produce.

I claim:

1. A rotary fan comprising a tubular body member of thin metal having its cylindrical wall, at places intermediate of its length, displaced radially outward to provide a pair of integral abutting shoulders thereon, and face-disk and pulley members fitted to the respective ends of said body portion and in abutment against the shoulders thereof.

2. A rotary fan comprising a tubular body member of thin metal having its cylindrical wall, intermediate of its ends, displaced radially outward to provide an integral abutting shoulder thereon, and a hub member fitted to the end of said body portion and against said shoulder, said tubular body being provided at its end with a cylindrical bushing to afford bearing for the fan when in use, and said bushing having a radial flange overlapping a portion of the hub member.

3. A rotary fan comprising a tubular body member of thin metal having its cylindrical wall, intermediate of its ends, displaced radially outward to provide an integral abutting shoulder thereon, and a hub member fitted to the end of said body portion and against said shoulder, said tubular body having at its respective ends tubular bushings affording bearings upon which the fan may turn, and said bushings having their ends spaced apart in the tubular body and leaving therein an enlarged lubricant space, the annular shoulder on the tubular body being recessed, and the recess thereof communicating with said lubricant space.

4. A pulley comprising a tubular body having a shoulder, dished disks fitted upon said tubular body, and a rim member supported on and centered by said disks, one of said disks being seated against the shoulder of the tubular body, and the end of the tubular body being upset to provide a retaining lip bearing against the other disk.

5. In a pulley, the combination of a tubular body formed with a shoulder, disks fitted to said tubular body and dished to provide radially presented shoulders thereon, a rim member fitting the shoulders of the dished disks, and means for developing pressure against one disk through the rim member to the other disk, and holding the latter against the shoulder of the body member.

Signed at Chicago, Illinois, this 16th day of Feb., 1920.

ARVID NELSON.